United States Patent Office 3,536,706
Patented Oct. 27, 1970

3,536,706
PHENOTHIAZINE COMPOUNDS
Donald R. Randell, Cheshire, England, assignor, by mesne assignments, to Geigy Chemical Corporation, Ardsley, N.Y., a corporation of New York
No Drawing. Application Feb. 10, 1966, Ser. No. 526,401, now Patent No. 3,414,618, dated Dec. 3, 1968, which is a division of application Ser. No. 431,709, Feb. 10, 1965. Divided and this application Apr. 26, 1968, Ser. No. 753,321
Claims priority, application Great Britain, Feb. 11, 1964, 5,593/64; Feb. 29, 1964, 8,579/64
Int. Cl. C07d 93/14
U.S. Cl. 260—243  2 Claims

ABSTRACT OF THE DISCLOSURE

Mono-tertiary alkyl heterocyclic compounds having the formula:

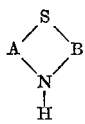

wherein A and B are the same or different and each is an aryl group, and one of the aryl groups A and B contains a tertiary alkyl substituent group having from 4 to 12 carbon atoms possess valuable antioxidant properties.

---

This application is a divisional application of application Ser. No. 526,401, filed Feb. 10, 1966, now U.S. Pat. 3,414,618, which application is in turn a divisional application of application Ser. No. 431,709, filed Feb. 10, 1965, and now abandoned.

The present invention relates to organic compounds having valuable antioxidant properties and to synthetic lubricants containing antioxidants.

It is known that dialkylated derivatives of conventional antioxidant systems such as diphenylamine and phenothiazine, and synergistic combinations thereof, may be used as antioxidants in ester-based synthetic lubricants, and that these dialkylated derivatives do not have the disadvantage of bringing about the formation of oil-insoluble products in synthetic lubricants at high temperatures, which is encountered if phenothiazine itself is used. It was found that the requirements of standard test specifications could be met by incorporating dialkylated phenothiazines and dialkylated secondary amines, thus avoiding the so-called "phenothiazine dirtiness."

However, with the advent of gas turbine engines required to propel aircraft at greater speeds, has come a demand for lubricants which will function satisfactorily at still higher temperatures, at which lubricant compositions comprising the previously suggested dialkylated compounds do not pass the requirements of standard specification tests. For instance, the requirements of the Pratt and Whitney Type II oxidation-corrosion tests, carried out at 425° or 450° F. for 48 hours cannot be met by lubricants containing dialkylated derivatives of diphenylamine and phenothiazine.

It is an object of the present invention to provide improved antioxidants and compositions of synthetic lubricants containing improved antioxidants.

Accordingly, the present invention provides a mono-tertiary alkyl heterocyclic compound having the formula:

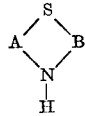

wherein A and B are the same or different and each is an aryl group, and one of the aryl groups A and B contains a tertiary alkyl substituent group having from 4 to 12 carbon atoms.

Each of the aryl groups A and B may be, for example, a benzene or naphthalene nucleus otherwise unsubstituted or containing further substituents, apart from the tertiary alkyl group which is necessarily present in one of groups A and B; if either or both of the groups A and B is a naphthalene residue, this may be a 1:2- or a 2:1-substituted naphthalene residue. The tertiary alkyl group may be, for example, tertiary butyl (1′:1′-dimethylethyl), tertiary pentyl (1′:1′-dimethylpropyl), tertiary hexyl (1′:1′-dimethylbutyl), tertiary octyl (1′:1′:3′:3′-tetramethylbutyl) or tertiary dodecyl (1′:1′:3′:3′:5′:5′-hexamethylhexyl).

The tertiary alkyl substituent group advantageously contains from 6 to 10 carbon atoms. The tertiary alkyl substituent preferably has a tertiary carbon atom directly attached to the aryl nucleus of which the alkyl group is a substituent.

If the aryl group A or B which contains the essential tertiary alkyl substituent is an unsubstituted or substituted phenyl group, the tertiary alkyl group is preferably in the 4-position relative to the carbon atom of the benzene ring directly attached to the nitrogen of the secondary amine grouping. If the aryl group A or B which contains the tertiary alkyl substituent is an otherwise unsubstituted or substituted naphthyl group, the tertiary alkyl group is preferably atached in the same or the analogous position as the 4-substituent in a phenyl group. These preferred structures may be represented as follows, wherein R represents the tertiary alkyl group and wherein the aryl nuclei may be otherwise unsubstituted (as shown) or substituted:

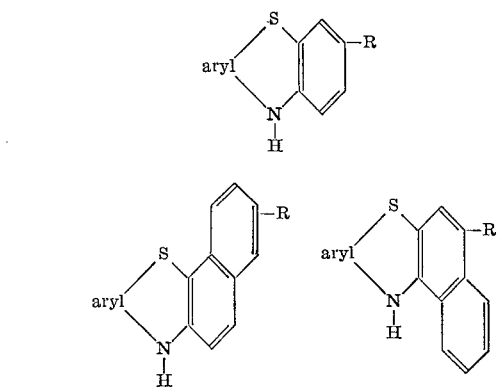

the aryl (R) group in each instance being an unsubstituted or substituted 1:2- or 2:1-naphthalene residue or, preferably, a benzene residue.

Examples of such phenothiazine compounds therefore include 3-tertiary butyl phenothiazine, 3-tertiary pentyl phenothiazine, 3-tertiary octyl phenothiazine, 3-tertiary dodecyl phenothiazine, and analogues thereof wherein one or both of the benzene rings is replaced by a 1:2- or 2:1-substituted naphthalene residue.

The mono-tertiary alkyl substituted phenothiazine compounds of the present invention are produced, for example, by thionating the corresponding mono-alkyl substituted diarylamine compound. The thionation can be carried out by reacting the mono-alkyl-substituted diarylamine compounds with elemental sulphur, at an elevated temperature, and preferably at a temperature in the range of from 100° to 250° C. If desired, the reaction can be conducted in the presence of an organic solvent inert under the reaction conditions, for instance xylene.

The reaction of the mono-alkyl-substituted diarylamine compound with sulphur can be carried out, if desired, in the presence of iodine or other thionation catalyst. The mono-alkyl-substituted diarylamine compound is preferably reacted with two atomic proportions of sulphur per molar proportion of the diarylamine compound. If desired, the mono alkylated phenothiazine compound can be isolated from the reaction mixture by conventional means, for example by crystallization.

The mono tertiary alkyl diarylamine used to produce the mono tertiary alkyl phenothiazine compounds of the present invention can be prepared, for example, by contacting the corresponding diarylamine with a 1- or 2-alkylene, the total number of carbon atoms in the molecule of the alkylene being from 4 to 12. In general, the 1- or 2-alkylenes react to produce the same mono tertiary alkyl diarylamine. For example, isopentene (consisting mainly of 2-methylbutene-1), di-isobutylene (a mixture of 2:4:4-trimethylpentene-1 and 2:4:4-trimethylpentene-2), propylene dimer (consisting mainly of 2-methylpentene-1) and triisobutylene (a mixture of 2:4:4:6:6-pentamethylheptene-1 and 2:4:4:6:6-pentamethylheptene-2) can be reacted with a diarylamine starting material to produce the mono - (1':1' - dimethylpropyl) - diarylamine, mono(1':1':3':3' - tetramethylbutyl)-diarylamine, mono-(1':1' - dimethylbutyl) - diarylamine and mono-(1':1':3':3':5':5'-hexamethylhexyl)-diarylamine, respectively.

The reaction with the alkylene can be carried out by heating the reactants together at an elevated temperature, preferably at a temperature in the range of from 100° to 250° C., and is preferably conducted under substantially anhydrous conditions. The reaction is advantageously effected in the presence of a Friedel-Crafts catalyst, for instance in the presence of aluminum chloride. The desired mono alkylated compound can be isolated from the reaction mixture, and if desired purified, by conventional means, for example by fractional distillation or crystallization.

The mono tertiary alkyl diarylamine can also be produced by contacting the corresponding diarylamine with a corresponding tertiary alkyl halide, for instance, a tertiary alkyl chloride. The reaction can be carried out by heating the reactants together at an elevated temperature, preferably at a temperature in the range of from 25° to 50° C. and is preferably conducted under substantially anhydrous conditions. The reaction is advantageously effected in the presence of a Friedel-Crafts catalyst, for instance in the presence of aluminum chloride. The mono tertiary alkyl diarylamine can be isolated from the reaction mixture, and if desired purified, by conventional means, for example by fractional distillation or crystallization.

The present invention also provides a composition which comprises a synthetic lubricant susceptible to oxidative deterioration and as antioxidant a mono tertiary alkyl-substituted heterocyclic compound, as hereinbefore defined, or a compound of the formula:

A—NH—B wherein A and B are the same or different and each is an aryl group, and one of the aryl groups A and B contains a tertiary alkyl substituent group having from 4 to 12 carbon atoms.

The synthetic lubricant is preferably a synthetic lubricant based on one or more organic carboxylic acid esters; intended for use at an operating temperature at or above 400° F. Examples of such synthetic lubricants include lubricants based on a diester of a dibasic acid and a monohydric alcohol, for instance dioctyl sebacate or dinonyl adipate; on a triester of trimethylolpropane and a monobasic acid or mixture of monobasic acids, for instance trimethylolpropane tripelargonate or trimethylolpropane tricaprylate; on a tetraester of pentaerythritol and a monobasic acid or mixture of monobasic acids, for instance pentaerythritol tetracaprylate; or on complex esters derived from monobasic acids, dibasic acids and polyhydric alcohols; or on mixtures thereof.

If the antioxidant present in the composition of the invention is a heterocyclic compound, the antioxidant is a mono tertiary alkyl substituted heterocyclic compound as hereinbefore defined.

If the antioxidant present in the composition of the invention is a diarylamine having the formula A—NH—B, the aryl groups A and B are as hereinbefore defined. Each of these aryl groups may be, for example, a benzene or naphthalene nucleus otherwise unsubstituted or containing further substituents, apart from the tertiary alkyl group which forms a substituent in one of the groups, A and B; if either or both of the groups A and B is a naphthalene residue, this may be an α- or β-naphthyl group. The tertiary alkyl group contains from 4 to 12 carbon atoms, and may be, for example, tertiary butyl (1':1'-dimethylethyl), tertiary pentyl (1':1'-dimethylpropyl), tertiary hexyl (1':1'-dimethylbutyl), tertiary octyl (1':1':3':3'-tetramethylbutyl) or tertiary dodecyl (1':1':3':3':5':5'-hexamethylhexyl). The tertiary alkyl substituent preferably has a tertiary carbon atom directly attached to the aryl nucleus of which the alkyl group is a substituent.

If the aryl group A or B which contains the essential tertiary alkyl substituent is an unsubstituted or substituted phenyl group, the tertiary alkyl group is preferably in the 4-position relative to the carbon atom of the benzene ring directly attached to the nitrogen atom of the secondary amine grouping. If the aryl group A or B which contains the tertiary alkyl substituent is an otherwise unsubstituted or substituted naphthyl group, the tertiary alkyl group is preferably attached in the same or the analogous position as the 4-substituent in a phenyl group. These preferred structures may be represented as follows, wherein R represents the tertiary alkyl group and wherein the aryl nuclei may be otherwise unsubstituted (as shown) or substituted:

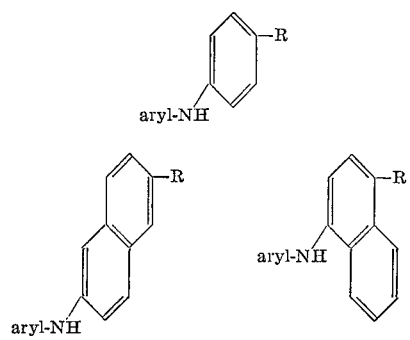

the aryl (R) groups in each instance being an unsubstituted or substituted phenyl, α-naphthyl or β-naphthyl group.

Examples of such diarylamines used as antioxidants in the composition of the present invention therefore include 4-tertiary pentyl-diphenylamine,
N-p-tertiary pentyl-phenyl-α-naphthylamine,
N-p-tertiary pentyl-phenyl-β-naphthylamine,
4-p-(1':1':3':3'-tetramethylbutyl)-diphenylamine,
N-p-(1:1:3:3-tetramethylbutyl)-phenyl-α-naphthylamine,
N-p-(1:1:3:3-tetramethylbutyl)-phenyl-β-naphthylamine,
4-p-(1':1':3':3':5':5'-hexamethylhexyl)-diphenylamine,
N-p-(1:1:3:3:5:5-hexamethylhexyl)-phenyl-α-naphthylamine,
N-p-(1:1:3:3:5:5-hexamethylhexyl)-phenyl-β-naphthylamine.

The mono tertiary alkyl diarylamines used as antioxidants in the composition of the present invention are produced, as hereinbefore set forth, for example, by contacting the corresponding diarylamine with a 1- or 2-alkylene, the total number of carbon atoms in the molecule of the alkylene being from 4 to 12. The reaction with the alkylene is carried out under the conditions hereinbefore disclosed and advantageously in the presence of a Friedel-Crafts catalyst, for instance in the presence of aluminum chloride.

The compositions of the invention may, if desired, also contain other constituents. For instance one or more load carrying additives, viscosity index improvers or pour-point depressants of conventional type for lubricants may be present. If desired, a metal deactivator may also be present in the composition: for example, benzotriazole or a copper-protecting derivative of benzotriazole may be present, preferably in a concentration within the range of from 0.01% to 1% by weight based on the total weight of the composition.

The proportion of antioxidant present in the compositions of the invention can be varied within wide limits. The compositions of the present invention may, for instance, contain from 0.1% to 10% by weight of antioxidant and preferably from 1.5% to 4% by weight based on the total weight of the composition.

The following examples further illustrate the present invention. Parts by weight shown therein bear the same relation to parts by volume as do kilograms to liters. Percentages shown are expressed by weight unless otherwise stated.

EXAMPLE 1

(A) 169.2 parts by weight of diphenylamine were heated with 140.3 parts by weight of di-isobutylene (a mixture of 75% of 2:4:4-trimethylpentene-1 and 25% of 2:4:4-trimethylpentene-2) and with 2.2 parts by weight of anhydrous aluminum chloride for 15 hours while maintaining the temperature within the range of from 108° to 146° C.

The product was a mixture of 4- and 4:4'-tertiary octyl diphenylamines with unreacted diphenylamine. The desired 4-tertiary octyl diphenylamine was separated from the other constituents of the reaction product by fractional distillation and was recrystallized from aqueous ethanol.

The 4-tertiary octyl diphenylamine thus obtained had melting point 48° to 49° C. and boiling point 150° to 154° C. at 0.22 millimeter of mercury pressure. The conversion achieved was 55%.

(B) 84.4 parts by weight of 4-tertiary octyl diphenylamine, produced by the procedure described in Example 1A, were heated with 10.2 parts by weight of sulphur for 20 hours while maintaining the temperature within the range of from 200° to 220° C. The reactants were heated until the rate of evolution of hydrogen sulphide was very slow.

The crude reaction product was crystallized from petroleum ether (boiling point range 60° to 80° C.) to produce 3-tertiary octyl phenothiazine, having melting point 118° C. and the following elemental analysis:

Calculated ($C_{20}H_{26}NS$) (percent): C, 77.11; H, 8.10; N, 4.50; S, 10.14. Found (percent): C, 76.82; H, 8.07; N, 4.52; S, 10.29.

The yield was 72% theoretical.

EXAMPLE 2

(A) 657 parts by weight of N-phenyl-α-naphthylamine were heated with 673 parts by weight of di-isobutylene (having the same composition as that used in Example 1), and 6.6 parts by weight of anhydrous aluminum chloride for 26 hours, while maintaining the temperature at 108° to 136° C.

The product was N-p-tertiary octyl-phenyl-α-naphthylamine, having melting point 76° to 77° C. and the following elemental analysis:

Calculated ($C_{24}H_{29}N$) (percent): C, 86.96; H, 8.82; N, 4.23. Found (percent): C, 86.94; H, 8.82; N, 4.05.

The yield was 62% theoretical.

(B) 109.4 parts by weight of N-p-tertiary octyl-phenyl-α-naphthylamine, produced by the procedure described in Example 2A were dissolved in 200 parts by volume of xylene and the solution was heated with 21.5 parts by weight of sulphur and 1.1 parts by weight of iodine as thionation catalyst. The mixture was heated at 148° C. for 24 hours.

The thionation product was 9-tertiary octyl 12H-benzo-[α]-phenothiazine, having melting point 147° to 148° C. and the following elemental analysis:

Calculated $C_{24}H_{27}NS$) (percent): C, 79.73; H, 7.53; N, 3.88; S, 8.87. Found (percent): C, 79.35; H, 7.60; N, 3.96; S, 8.93.

The yield was 56% theoretical.

EXAMPLE 3

(A) The procedure described as Example 2A was carried out using 219.3 parts by weight of N-phenyl-β-naphthylamine instead of the N-phenyl-α-naphthylamine, the reaction conditions being otherwise the same.

The product was N-p-tertiary octyl-phenyl-β-naphthylamine, having melting point 126° C. and the following elemental analysis:

Calculated ($C_{24}H_{29}N$) (percent: C, 86.96; H, 8.82; N, 4.23. Found (percent): C, 87.18; H, 8.84; N, 4.40.

The yield was 53% theoretical.

(B) The procedure described in Example 2B was carried out using 87.5 parts by weight of N-p-tertiary octyl-phenyl-β-naphthylamine, produced by the procedure described in Example 3A, instead of the N-tertiary octyl-phenyl-α-naphthylamine, the reaction conditions being otherwise the same except that the reaction temperature was maintained in the range of from 210° to 220° C.

The thionation product was 10-tertiary octyl-7H-benzo-[c]-phenothiazine, having melting point 140° C. and the following elemental analysis:

Calculated ($C_{24}H_{29}N$) (percent): C, 86.96; H, 8.82; N, 3.88; S, 8.87. Found (percent): C, 79.91; H, 7.57; N, 4.02; S, 8.66.

The yield was 73% theoretical.

EXAMPLE 4

On incorporating 4-tertiary octyl diphenylamine prepared as described in Example 1A into an ester-based synthetic lubricant, the product was found to be an effective antioxidant.

EXAMPLE 5

On incorporating N-p-tertiary octyl-phenyl-α-naphthylamine prepared as described in Example 2A into an ester-based synthetic lubricant, the product was found to be an effective antioxidant.

EXAMPLE 6

On incorporating N-p-tertiary octyl-phenyl-β-naphthylamine prepared as described in Example 3A into an ester-based synthetic lubricant, the product was found to be an effective antioxidant.

EXAMPLE 7

84.6 parts by weight of diphenylamine, 185 parts by weight of tertiary butyl chloride and 23.7 parts by weight of anhydrous aluminum chloride were reacted together at 35° C. for 3 hours and the mixture was then boiled under reflux for 24 hours. Unreacted tertiary butyl chloride was then removed by distillation; the residue was dispersed in toluene and treated with aqueous sodium hydroxide. The solvent was then evaporated off and the residue was fractionally distilled.

4-tertiary butyl diphenylamine was obtained as distillate in the fraction having boiling point range of 130° to 148° C. at 0.35 millimeter of mercury pressure. 4:4'-tertiary butyl diphenylamine (having melting point 107° to 108° C.) and unreacted diphenylamine were also isolated from the reaction mixture.

The 4-tertiary butyl diphenylamine obtained was purified by crystallization and recrystallization from aqueous ethanol. The product had melting point 67° to 68° C.

On incorporating 4-tertiary butyl diphenylamine into an ester-based synthetic lubricant, the product was found to be an effective antioxidant.

EXAMPLE 8

To a mixture of 219.2 parts by weight of N-phenyl-β-naphthylamine and 2.2 parts by weight of anhydrous aluminum chloride were slowly added 140.2 parts by weight of isopentene (consisting mainly of 2-methylbutene-1) over 8 hours while maintaining the temperature of the reaction mixture at 100° to 120° C.

N-p-tertiary pentyl-phenyl-β-naphthylamine produced was isolated from the reaction product, after washing with aqueous sodium hydroxide solution, by fractional crystallization from petroleum ether (boiling point range 60° to 80° C.). The product had melting point 75° C. and the following elemental analysis:

Calculated (CHN) (percent): C, 87.12; H, 8.04; N, 4.83. Found (percent): C, 87.19; H, 8.00; N, 4.80.

On incorporating into an ester-based synthetic lubricant the product was found to be an effective antioxidant.

EXAMPLE 9

164.4 parts of N-phenyl-β-naphthylamine were heated to 160° C. with 1.7 parts of anhydrous aluminum chloride for 10 minutes, cooled to 140° C. and iso-butylene gas passed into the mixture until absorption of the gas was complete. The reaction time was approximately 8 hours. The reaction mixture was taken up into toluene and washed with aqueous sodium hydroxide and then water until the washings were neutral. The toluene was distilled off in vacuo and the residue distilled. The fraction boiling point 180° to 182° C./0.3 mm. was recrystallized from petroleum ether (boiling point 60° to 80° C.) to provide 45 parts (representing a yield of 17.3% of the theoretical) of N-p-t-butyl-phenyl-β-naphthylamine, melting point 77° to 78° C. The product had the following elemental analysis by weight:

Calculated ($C_{20}H_{21}N$) (percent): C, 87.10; H, 7.75; N, 5.05. Found (percent): C, 87.00; H, 7.81; N, 5.18.

On incorporating into an ester-based synthetic lubricant, the product was found to be an effective antioxidant.

EXAMPLE 10

In a similar manner from 164.4 parts of N-phenyl-α-naphthylamine were obtained 100 parts (representing a yield of 48.8% of the theoretical) of N-p-t-butyl-phenyl-α-naphthylamine, melting point 87.5° C. (from petroleum ether boiling point 60° to 80° C.). The product had the following elemental analysis by weight:

Calculated ($C_{20}H_{21}N$) (percent): C, 87.10; H, 7.75; N, 5.05. Found (percent): C, 86.87; H, 7.73; N, 4.94.

On incorporating into an ester-based synthetic lubricant, the product was found to be an effective antioxidant.

EXAMPLE 11

219.3 parts of N-phenyl-α-naphthylamine were heated to 120° C. with 2.2 parts of anhydrous aluminum chloride, cooled to 100° C. and 105.3 parts of iso-pentene (2-methylbutene-1) added over 2.5 hours. To complete the reaction the mixture was refluxed for 3 hours. The reaction mixture was then taken up into toluene, washed with aqueous sodium hydroxide and finally with water until the washings were neutral. Distillation of the residue after removal of the toluene provided a fraction consisting mainly of unreacted N-phenyl-α-naphthylamine but the residue on recrystallization from methanol provided 69 parts (representing a yield of 20% of the theoretical) of N-p-t-pentyl-phenyl-α-naphthylamine, melting point 71° C. The product had the following elemental analysis by weight:

Calculated ($C_{21}H_{23}N$) (percent): C, 87.15; H, 8.01; N, 4.84. Found (percent): C, 86.93; H, 8.25; N, 4.79.

On incorporating into an ester-based synthetic lubricant, the product was found to be an effective antioxidant.

EXAMPLE 12

Similarly from 438.6 parts of N-phenyl-β-naphthylamine were prepared 156.5 parts (representing a yield of 43.7% of the theoretical) of N-p-t-pentyl-phenyl-β-naphthylamine, melting point 76° C. The product had the following elemental analysis by weight:

Calculated ($C_{21}H_{23}N$) (percent): C, 87.15; H, 8.01; N, 4.84. Found (percent): C, 87.12; H, 8.25; N, 4.79.

On incorporating into an ester-based synthetic lubricant, the product was found to be an effective antioxidant.

EXAMPLE 13

109.5 parts of N-phenyl-α-naphthylamine and 1.1 parts of anhydrous aluminum chloride were heated together for 10 minutes at 145° C. and then 63 parts of 2-methyl-pentene-1 ((propylene dimer) added over 4.5 hours at 130° to 140° C. After this addition the crude reaction product was dissolved in toluene, washed to remove the catalyst and the residue after removal of the toluene distilled to provide 106 parts (representing a yield of 70% of the theoretical) of N-p-t-hexylphenyl-α-naphthylamine, boiling point 215° C./1 mm. The product had the following elemental analysis by weight:

Calculated ($C_{22}H_{25}N$) (percent): C, 87.08; H, 8.30; N, 4.62. Found (percent): C, 86.75; H, 8.63; N, 4.41.

On incorporating into an ester-based synthetic lubricant, the product was found to be an effective antioxidant.

EXAMPLE 14

Similarly from 109.5 parts of N-phenyl-β-naphthylamine were obtained 85 parts (representing a yield of 56.3% of the theoretical) of N-p-t-hexyl-phenyl-β-naphthylamine, melting point 51° C. The product had the following elemental analysis by weight:

Calculated ($C_{22}H_{25}N$) (percent): C, 87.08; H, 8.30; N, 4.62. Found (percent): C, 87.14; H, 8.43; N, 4.44.

On incorporating into an ester-based synthetic lubricant, the product was found to be an effective antioxidant.

EXAMPLES 15 TO 19

Synthetic ester-based lubricant compositions were prepared into which were incorporated either a monotertiary alkyl phenothiazine or a mono-tertiary alkyl diarylamine compound of the present invention and subjected to an oxidation-corrosion test. The base fluid in each of the tests was trimethylolpropane tripelargonate and each test was carried out for 6 hours at 260° C. (500° F.) with dry air at the rate of 5 liters per hour in the presence of two mild steel specimens having ¾ inch outside diameter and 5/16 inch inside diameter (British Standard Specification No. 3).

To each lubricant sample had been added 1.5% by weight of a mono-tertiary alkyl-substituted compound in accordance with the invention, based on the total weight of the lubricant composition.

The results of the tests are given in Table I. In this table the final acid value is expressed as milligrams of potassium hydroxide per gram; the sludge is expressed as milligrams; and the weight change of the steel specimens is expressed as milligrams per square centimeter. Included in the table are the results of comparative tests carried out under the same conditions but with no additive and with compounds as additives which are other than those of the present invention.

The results in Table I demonstrate the ability of the monoalkylated compounds to provide protection to the lubricant oil without the production of oil insolubles and magnesium attack. The dialkylated derivatives used in the comparative tests described inhibited the production of sludge but cause heavy corrosion of magnesium, as shown hereinafter.

TABLE I

| Example | Additive | Percent additive | Percent viscosity increase at 100° F. | Final acid value | Sludge | Weight change of steel specimens |
|---|---|---|---|---|---|---|
|  | None | | 31.7 | 9.9 | 16 | +0.08:+0.07 |
|  | Phenothiazine | 1.0 | 12.9 | 3.7 | 617 | +0.11:+0.16 |
|  | Iminodibenzyl | 1.0 | 4.4 | 3.5 | Moderate | +0.22:+0.19 |
|  | Diphenylamine | 1.0 | 9.5 | 4.4 | 343 | +0.08:+0.28 |
|  | Di-tertiary octyl-phenothiazine | 2.0 | 14.9 | 8.0 | 11 | +0.63:+0.71 |
|  | N-phenyl-α-naphthylamine | 1.0 | 9.2 | 4.5 | 274 | +0.07:+0.12 |
|  | 4:4'-tertiary octyldiphenylamine | 2.0 | 19.4 | 6.7 | 10 | +0.65:+0.55 |
| 15 | 10-tertiary octyl-7H-benzo[c]-phenothiamine. | 1.5 | 14.8 | 5.9 | 1 | +0.10:+0.12 |
| 16 | 9-tertiary octyl-12-benzo[a] phenothiazine. | 1.5 | 24.2 | 7.3 | 24 | +0.12:+0.12 |
| 17 | 3-tertiary octyl-phenothiazine | 1.5 | 12.9 | 6.6 | 4 | +0.03:+0.02 |
| 18 | N-p-tertiary octyl-phenyl-α-naphthylamine. | 1.5 | 17.0 | 4.1 | 10 | +0.19:+0.20 |
| 19 | N-p-tertiary octyl-phenyl-β-naphthylamine. | 1.5 | 8.8 | 2.4 | 1 | +0.03:+0.01 |

EXAMPLES 20 TO 24

Synthetic ester-based lubricant compositions were produced and subjected to the Pratt & Whitney Type II oxidation-corrosion test. The base fluid was pentaerythritol tetracaprylate and each test was carried out for 48 hours at 425° F. with dry air at the rate of 5 liters per hour and in the presence of specimens of magnesium alloy, aluminum alloy, copper, silver and steel.

To each lubricant sample had been added to proportions of a phenothiazine- or diarylamine type additive and benzotriazole as stated in Table II.

The results of the tests are given in Table II which includes comparisons where no additive or an additive other than a monoalkylated compound of the present invention was present. In the table, the acid value increase is expressed as milligrams of potassium hydroxide per gram; the sludge is expressed in milligrams; and the weight change of the specimens as milligrams per square centimeter.

Synthetic ester-based lubricant compositions were produced and subjected to the Pratt & Whitney Type II oxidation-corrosion test. The base fluid was pentaerythritol tetracaprylate and each test was carried out for 48 hours at 450° F. with dry air at the rate of 5 liters per hour and in the presence of specimens of magnesium alloy, aluminum alloy, copper, silver and steel.

To each lubricant sample had been added the proportions of a phenothiazine type additive and benzotriazole as stated in Table III.

The results of the tests are given in Table III which includes comparisons where no additive or an additive other than a monoalkylated compound of the present invention was present.

In the table, the acid value increase is expressed as milligrams of potassium hydroxide per gram; the sludge is expressed in milligrams; and the weight change of the specimens as milligrams per square centimeter.

The results in Table III demonstrate the effectiveness of the specified monoalkylated compound of this invention and its superior properties over related compounds not monoalkylated.

TABLE II

| Example | Additive | Percent additive | Percent viscosity increase at 100° F. | Acid value increase | Sludge | Weight change of specimens | | | | |
|---|---|---|---|---|---|---|---|---|---|---|
| | | | | | | Mg alloy | Al alloy | Cu | Ag | Steel |
|  | None | | 246.2 | 11.5 | 21.3 | −19.80 | +0.03 | +0.65 | +0.03 | +0.03 |
|  | Phenothiazine | 2.0 | 30.2 | 5.8 | 376.5 | +0.14 | +0.07 | −0.22 | +0.18 | +0.08 |
|  | Iminodibenzyl | 2.0 | 12.0 | 2.0 | 294.9 | +0.14 | +0.06 | −0.30 | +0.10 | Nil |
|  | Diphenylamine | 2.0 | 35.4 | 3.8 | 80.2 | −4.75 | Nil | −0.69 | +0.01 | Nil |
|  | N-phenyl-α-naphthylamine | 2.0 | 26.5 | 3.4 | 50.9 | +0.03 | +0.07 | +1.57 | +0.03 | +0.04 |
|  | N-phenyl-β-naphthylamine | 2.0 | 23.9 | 3.3 | 20.0 | +0.03 | Nil | −0.83 | +0.08 | +0.06 |
|  | 3:7-di-tertiary octyl-phenothiazine plus benzotriazole. | 4.0 / 0.5 | 40.6 | 5.61 | 3.0 | −0.41 | −0.01 | −0.62 | −0.03 | −0.01 |
|  | 2:8-di-tertiary octyliminodibenzyl plus benzotriazole. | 4.0 / 0.5 | 27.0 | 3.2 | 5.8 | −3.79 | Nil | −1.09 | −0.04 | −0.04 |
|  | 4:4'-di-tertiary octyl-diphenylamine plus benzotriazole. | 4.0 / 0.5 | 35.5 | 3.8 | 2.8 | −3.83 | −0.01 | +0.44 | +0.04 | +0.01 |
| 20 | 3-tertiary octyl-phenothiazine plus benzotriazole. | 3.0 / 0.5 | 47.6 | 5.0 | 1.6 | −0.09 | −0.01 | −0.28 | −0.04 | +0.03 |
| 21 | 4-tertiary octyl-diphenylamine plus benzotriazole. | 3.0 / 0.5 | 37.5 | 3.0 | 3.0 | −0.20 | −0.02 | −0.15 | −0.01 | +0.01 |
| 22 | 10-tertiary octyl-7H-benzo-[c]-phenothiazine benzotriazole. | 3.0 / 0.5 | 40.7 | 8.1 | 2 | −0.67 | −0.01 | −0.79 | −0.03 | −0.02 |
| 23 | N-p-tertiary octyl-phenyl-α-naphthyl-amine plus benzotriazole. | 3.0 / 0.5 | 29.0 | 2.5 | 1.0 | Nil | Nil | −0.10 | Nil | −0.01 |
| 24 | N-p-tertiary octyl-phenyl-β-naphthylamine plus benzotriazole. | 3.0 / 0.5 | 27.6 | 2.0 | 0.8 | −0.05 | −0.01 | −0.16 | −0.01 | −0.01 |

EXAMPLE 25

TABLE III

| Example | Additive | Percent additive | Percent viscosity increase at 100° F. | Acid value increase | Sludge | Weight change of specimens | | | | |
|---|---|---|---|---|---|---|---|---|---|---|
| | | | | | | Mg alloy | Al alloy | Cu | Ag | Steel |
|  | None | | (1) | (1) | (1) | (2) | −0.01 | −0.14 | +0.03 | −1.48 |
|  | Phenothiazine | 2.0 | (1) | (1) | (1) | −2.86 | +0.09 | −0.66 | +0.13 | +0.22 |
|  | 3:7-di-tertiary octyl phenothiazine plus benzotriazole. | 4.0 / 0.5 | 71.7 | 20.6 | (3) | −56.90 | +0.01 | −0.34 | Nil | Nil |
| 25 | 3-tertiary octyl-phenothiazine plus benzotriazole. | 3.0 / 0.5 | 78.1 | 4.1 | 2 | −0.15 | −0.01 | −0.36 | −0.03 | +0.02 |

1 Determinations impossible due to excessive polymerisation.
2 Completely corroded.
3 Not filterable.

EXAMPLES 26 TO 32

Synthetic ester-based lubricant compositions were produced and subjected to the Pratt & Whitney Type II oxidation-corrosion test. The base fluid was a complex ester of sebacic acid, caprylic acid and trimethylol propane, the complex ester being described and claimed in British Pat. 971,901. Each test was carried out for 48 hours at 425° F. with dry air at the rate of 5 liters per hour and in the presence of specimens of magnesium alloy, aluminum alloy, copper, silver and steel.

To each lubricant sample had been added the proportions of a phenothiazine or diarylamine type additive and benzotriazole as stated in Table IV.

The results of the tests are shown in Table IV which includes comparisons where no additive or an additive other than a monoalkylated compound of the present invention was present. In the table, the acid value increase is expressed as milligrams of potassium hydroxide per gram; the sludge is expressed in milligrams; and the weight change of the specimens as milligrams per square centimeter.

The results in Table IV demonstrate the effectiveness of the monoalkylated diarylamine compounds and their superior properties over related compounds not monoalkylated.

EXAMPLES 33 and 34

Synthetic ester-based lubricant compositions were produced and subjected to the MIL-L-7808E oxidation-corrosion test. The base fluid was di-2-ethylhexyl sebacate and each test was carried out for 72 hours at 375° F. with dry air at the rate of 5 liters per hour and in the presence of specimens of magnesium alloy, aluminum alloy, copper, silver and steel.

To each lubricant sample had been added the proportions of a diarylamine type additive as stated in Table V.

The results of the tests are given in Table V which includes comparisons where no additive or an additive other than a monoalkylated compound of the present invention was present. In the table, the acid value increase is expressed as milligrams of potassium hydroxide per gram; the sludge is expressed in milligrams; and the weight change of the specimens as milligrams per square centimeter.

TABLE IV

| Example | Additive | Percent additive | Percent viscosity increase at 100° F. | Acid value increase | Sludge | Weight change of specimens | | | | |
|---|---|---|---|---|---|---|---|---|---|---|
| | | | | | | Mg alloy | Al alloy | Cu | Ag | Steel |
| | None | | 113.0 | 7.3 | 10.777 | −51.27 | +0.05 | −0.08 | +0.07 | −0.14 |
| | Phenothiazine | 2.0 | 134.0 | 2.9 | 850 | +0.02 | +0.02 | −0.38 | +0.02 | +0.09 |
| | Diphenylamine | 2.0 | 209.0 | 2.4 | 280 | −0.02 | −0.03 | −1.02 | +0.01 | −0.02 |
| | 4:4′-di-tertiary octyl diphenylamine plus benzotriazole. | 4.0 / 0.5 | 57.0 | 2.2 | 34 | −6.90 | −0.04 | −0.62 | −0.08 | −0.02 |
| 26 | N-p-tertiary butyl phenyl-α-naphthylamine plus benzotriazole. | 2.5 / 0.5 | 17.3 | 3.1 | 3.4 | +0.05 | +0.06 | −0.07 | +0.06 | Nil |
| 27 | N-p-tertiary pentyl phenyl-α-naphthylamine plus benzotriazole. | 2.5 / 0.5 | 21.4 | 1.0 | 27.7 | −0.10 | −0.07 | −0.15 | −0.06 | −0.07 |
| 28 | N-p-tertiary hexyl phenyl-α-naphthylamine plus benzotriazole. | 2.5 / 0.5 | 23.0 | 0.9 | 0.6 | +0.02 | Nil | −0.09 | Nil | +0.03 |
| 29 | N-p-tertiary hexyl phenyl-α-naphthylamine plus benzotriazole. | 3.0 / 0.5 | 20.7 | 0.4 | 4.3 | −0.01 | Nil | −0.08 | −0.01 | +0.01 |
| 30 | N-p-tertiary butyl phenyl-β-naphthylamine plus benzotriazole. | 2.5 / 0.5 | 17.7 | 0.4 | 0.5 | +0.05 | +0.08 | +0.08 | +0.07 | +0.07 |
| 31 | N-p-tertiary pentyl phenyl-β-naphthylamine plus benzotriazole. | 2.5 / 0.5 | 18.2 | 0.5 | 1.0 | −0.01 | Nil | +0.01 | −0.03 | +0.01 |
| 32 | N-p-tertiary hexyl phenyl-β-naphthylamine plus benzotriazole. | 3.0 / 0.5 | 23.8 | 1.1 | 2.8 | +0.03 | +0.05 | +0.05 | +0.06 | +0.01 |

TABLE V

| Example | Additive | Percent additive | Percent viscosity increase at 100° F. | Acid value increase | Sludge | Weight change of specimens | | | | |
|---|---|---|---|---|---|---|---|---|---|---|
| | | | | | | Mg alloy | Al alloy | Cu | Ag | Steel |
| | None | | 142.8 | 24.4 | 228 | −37.89 | +0.04 | −1.38 | +0.03 | +0.02 |
| | Phenothiazine | 1.0 | 0.8 | 12.5 | 80 | +0.01 | +0.01 | +0.01 | +0.03 | +0.05 |
| | 3:7-di-tertiary octyl phenothiazine | 2.0 | 5.8 | 3.2 | 7 | Nil | +0.01 | −4.92 | −0.13 | +0.02 |
| | 4:4′-di-tertiary octyl diphenylamine | 2.0 | 10.3 | 4.2 | | −0.04 | −0.06 | −5.74 | −0.02 | −0.06 |
| 33 | N-p-tertiary octyl phenyl-α-naphthylamine. | 1.5 | 4.2 | 1.5 | | −0.17 | −0.02 | −0.12 | −0.04 | −0.05 |
| 34 | N-p-tertiary octyl phenyl-β-naphthylamine. | 1.5 | 3.2 | 0.9 | 0.7 | −0.01 | −0.05 | −0.10 | −0.02 | −0.01 |

The results in Table V demonstrate the effectiveness of the monoalkylated diarylamine compounds and their superior properties over related compounds not monoalkylated.

Having thus disclosed the invention, what is claimed is:
1. 9-tertiary octyl-12H-benzo[a]-phenothiazine.
2. 10-tertiary octyl-7H-benzo-[c]-phenothiazine.

References Cited

UNITED STATES PATENTS 2,931,810   2/1957   Yale et al. _____ 260—243

FOREIGN PATENTS 889,341   1962   Great Britain.

OTHER REFERENCES

Sowinski et al., J. Med. Chem. vol. 5, pp. 54–63 (1962).
Buu-Hoi, J. Chem. Soc. (1950), pp. 1146–52.

HENRY R. JILES, Primary Examiner

H. I. MOATZ, Assistant Examiner

U.S. Cl. X.R.

252—47, 47.5, 402; 260—516